(12) United States Patent
Zarubica et al.

(10) Patent No.: US 10,312,587 B1
(45) Date of Patent: Jun. 4, 2019

(54) DESIGNING AN ANTENNA ARRAY TO MEET SPECIFIED PERFORMANCE CRITERIA

(71) Applicant: L3 Technologies, Inc., New York, NY (US)

(72) Inventors: Radivoje Zarubica, Salt Lake City, UT (US); Samuel C. Kingston, Salt Lake City, UT (US); Neil K. Harker, Salt Lake City, UT (US); N. Thomas Nelson, Salt Lake City, UT (US)

(73) Assignee: L-3 COMMUNICATIONS CORP., New York, NY (US)

( * ) Notice: Subject to any disclaimer, the term of this patent is extended or adjusted under 35 U.S.C. 154(b) by 129 days.

(21) Appl. No.: 15/785,260

(22) Filed: Oct. 16, 2017

(51) Int. Cl.
*H01Q 21/00* (2006.01)
*H01Q 3/26* (2006.01)
*G01S 5/02* (2010.01)

(52) U.S. Cl.
CPC ........... *H01Q 3/267* (2013.01); *G01S 5/0215* (2013.01)

(58) Field of Classification Search
CPC .................. H01Q 3/267; G01S 5/0215
See application file for complete search history.

(56) References Cited

U.S. PATENT DOCUMENTS

| 7,436,359 | B1 * | 10/2008 | Rose | G01S 5/12 342/424 |
|---|---|---|---|---|
| 7,911,376 | B2 * | 3/2011 | Hardacker | H01Q 3/267 342/174 |
| 2011/0032149 | A1 * | 2/2011 | Leabman | H01Q 1/246 342/368 |
| 2018/0131089 | A1 * | 5/2018 | Yilmaz | H01Q 21/065 |

* cited by examiner

*Primary Examiner* — Dameon E Levi
*Assistant Examiner* — David E Lotter
(74) *Attorney, Agent, or Firm* — Kirton McConkie; Brian Tucker

(57) ABSTRACT

An antenna array can be quickly and efficiently designed to meet specified performance criteria. A system can be configured to receive various performance criteria as inputs, and from these inputs, identify how elements of an antenna array should be arranged so that the antenna array will meet the performance criteria. An iterative process can be performed to identify at least one arrangement of elements that will best meet the performance criteria while also complying with specified structural constraints.

20 Claims, 2 Drawing Sheets

DESIGNING AN ANTENNA ARRAY TO MEET SPECIFIED PERFORMANCE CRITERIA

CROSS-REFERENCE TO RELATED APPLICATIONS

N/A

BACKGROUND

Geolocation refers to techniques for determining the geographic location of an object. Various types of geolocation exist. The present invention is applicable to environments where the object to be geolocated emits a signal. In such environments, various measurements can be performed on the received signal to estimate the location of the emitting object. For example, a receiver can perform angle (or direction) of arrival techniques to estimate the angle between the emitting object and the boresight vector of the antenna's receiver.

Angle of arrival techniques are often performed by detecting phase differences at a number of antennas that receive the signal emitted by the object. To detect the angle of arrival, the detected phase differences are compared to calculated phase differences (based on steering vectors) for each of a number of possible angles to identify which calculated phase differences most closely correlate with the detected phase differences. The angle that corresponds to the most closely correlated phase differences can then be identified as the angle of arrival of the received signal.

Because phase is cyclical, there may be instances where multiple sets of calculated phase differences closely correlate with the detected phase differences. In such instances, the angle of arrival calculations may yield multiple possible angles of arrival such that there would be ambiguity as to what the actual angle of arrival was. For example, a calculated phase difference corresponding to an incorrect angle of arrival may have a higher correlation than the calculated phase difference corresponding to the correct angle of arrival. Such ambiguity may be worsened in multipath environments since the phase of the multipath signal will interfere with the phase of the direct path signal.

BRIEF SUMMARY

The present invention is generally directed to systems, methods and computer program products for designing an antenna array to meet specified performance criteria. A system can be configured to receive various performance criteria as inputs, and from these inputs, identify how antenna elements of an antenna array should be arranged so that the antenna array will meet the performance criteria. An iterative process can be performed to identify at least one arrangement of antenna elements that will best meet the performance criteria while also complying with specified structural constraints.

In one embodiment, the present invention is implemented by an antenna array design system as a method for identifying an arrangement of antenna elements that will meet required performance criteria based on structural constraints. The antenna array design system receives input that defines required performance criteria for an antenna array including an angle of arrival accuracy and a probability of ambiguous arrival. The antenna array design system also receives input that defines structural constraints for the antenna array including a number of antenna elements, a field of view, and a maximum distance between any two antenna elements in one dimension. The antenna array design system calculates, based on the structural constraints, a number of samples that are required to achieve the angle of arrival accuracy, and also calculates, based on the structural constraints and the number of samples, a minimum signal to noise ratio reduction parameter. The antenna array design system identifies, based on the structural constraints, a search space within which antenna elements of the antenna array will be positioned. The antenna array design system then selects a first arrangement of the number of antenna elements within the search space, calculates, for each of a number of angles within the field of view, a signal to noise ratio reduction parameter for the first arrangement, and determines that a minimum of the noise ratio reduction parameters calculated for the first arrangement exceeds the minimum signal to noise ratio reduction parameter. The antenna array design system also calculates, for each of a number of angles within the field of view, an angle of arrival error resulting from coherent multipath for the first arrangement, generates a sum of the angle of arrival errors for the first arrangement, and determines that the sum of the angle of arrival errors for the first arrangement is less than a corresponding sum of angle of arrival errors for one or more other arrangements of antenna elements. As a result, the antenna array design system generates output that identifies that the first arrangement meets the required performance criteria and provides better multipath resistance than the one or more other arrangements.

In another embodiment, the present invention is implemented as an antenna array design system that comprises one or more non-transitory computer readable media storing computer-executable instructions which when executed implement a method for identifying an arrangement of antenna elements that will meet required performance criteria based on structural constraints. The method comprises: receiving input that defines required performance criteria for an antenna array, the required performance criteria including an angle of arrival accuracy and a probability of ambiguous arrival; receiving input that defines structural constraints for the antenna array, the structural constraints including a number of antenna elements, a field of view, and a maximum distance between any two antenna elements in one dimension; calculating, based on the structural constraints, a number of samples that are required to achieve the angle of arrival accuracy; calculating, based on the structural constraints and the number of samples, a minimum signal to noise ratio reduction parameter; identifying, based on the structural constraints, a search space within which antenna elements of the antenna array will be positioned; and iteratively evaluating a plurality of possible arrangements of the antenna elements within the search space. The iterative evaluation includes, for each possible arrangement: calculating, for each of a number of angles within the field of view, a signal to noise ratio reduction parameter for the arrangement; determining whether a minimum of the noise ratio reduction parameters calculated for the arrangement exceeds the minimum signal to noise ratio reduction parameter; when the minimum of the noise ratio reduction parameters calculated for the arrangement exceeds the minimum signal to noise ratio reduction parameter, calculating, for each of a number of angles within the field of view, an angle of arrival error resulting from coherent multipath for the arrangement and generating a sum of the angle of arrival errors for the arrangement; and determining whether the sum of the angle of arrival errors for the arrangement is less than a corresponding sum of angle of arrival errors for previously evaluated arrangements, and if so, saving the arrangement as a best arrangement.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, the term "performance criteria" will be used to generally refer to three different metrics of an antenna array: (1) "angle of arrival accuracy" or $\sigma_{AoA}$; (2) "probability of ambiguous arrival" of $P_{ambig}$; and (3) "multipath resistance" which will be represented as the error caused by coherent multipath or $\Delta\phi$. Although these terms will be mathematically defined below, they can generally be defined as follows: an antenna array's "angle of arrival accuracy" defines how accurate an angle of arrival system's estimated angle of arrival matches the actual angle of arrival of a received signal; an antenna array's "probability of ambiguous arrival" defines how frequently an angle of arrival system will select an incorrect angle; and an antenna array's "multipath resistance" defines the degree to which coherent multipath affects the accuracy of the antenna array. As will be described below, required performance criteria can be provided as input to an antenna array design system, and the system can identify an arrangement of antenna elements that will meet the performance criteria. In some embodiments, a signal to noise ratio of the link ($SNR_{in}$ which represents the expected SNR of the signal when it is received at the antenna elements) may also be provided as a required performance criteria, while in other embodiments, the SNR of the link may be assumed.

The term "structural constraints" will be used to refer to any constraints on the physical configuration of the antenna array. For example, structural constraints may include a number of antenna elements in the antenna array ($N_{AR}$), a required field of view ($AZ_{min}$, $EL_{min}$, $AZ_{max}$, $EL_{max}$), the maximum distance between any two antenna elements in one dimension ($d_{max}$), etc. Based on the specified structural constraints and the required performance criteria, an antenna array design system can identify a most suitable arrangement of antenna elements for an antenna array.

Figure 1:
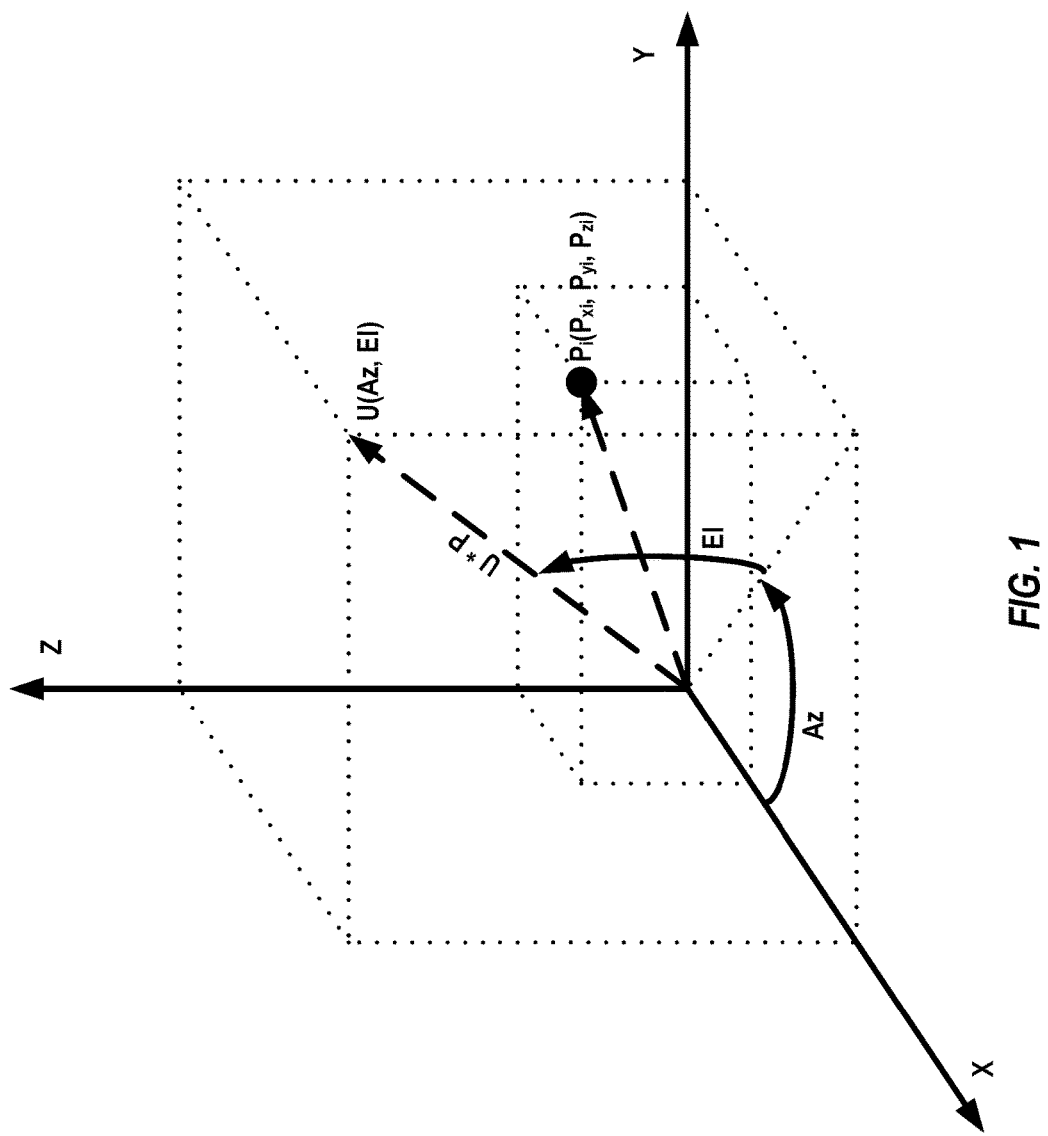
FIG. 1 illustrates an example coordinate system that can be used to calculate various performance criteria for an antenna array.

FIG. 1 provides an example of the antenna array geometry that will be used in this description. It should be understood, however, that the present invention should not be limited to any particular orientation of the coordinate system. Of importance is the fact that the measurements of an angle of arrival system are based on some reference orientation of the axes.

In FIG. 1 and the following description, the relative position of an antenna element of the antenna array will be defined by the position vector $P_i$ ($P_{ix}$, $P_{iy}$, $P_{iz}$) where the units of the position vector are assumed to be carrier cycles. For simplicity, FIG. 1 shows only one antenna element, but of course, an antenna array will include multiple antenna elements that are positioned in a one, two or three dimensional arrangement. The vector U (Az, El) represents the vector that points in the direction defined by azimuth and elevation angles. In the depicted coordinate system, a point at 0° azimuth would lie on the x-z plane and a point at 0° elevation would lie on the y-z plane. As shown below, each element $g_i$ of a steering vector G defines the antenna gain of a particular antenna element in the direction of the vector U (Az, El). This steering vector consists of a magnitude part (which for simplicity is assumed to be unity) and a phase part that is proportional to the dot product between U (Az, El) and the antenna element's position vector $P_i$($P_{ix}$, $P_{iy}$, $P_{iz}$).

$$g_i = e^{-j2\pi U \cdot P_i} \quad (1)$$

where $$U(Az,El)=(u_x,u_y,u_z)=(\cos(El)\cos(Az),\cos(El)\sin(Az),\sin(El)) \quad (2)$$

In non-mathematical terms, for a signal emitted by an object positioned at a particular angle (Az, El) from the antenna array's reference coordinates, the value of $g_i$ will define what the phase of the signal should be when it is received at the antenna element at position $P_i$ relative to the phases of the signal when received at antenna elements at other positions.

The present invention is generally directed to techniques for identifying the position $P_i$ at which each of a number of antenna elements should be placed to produce an antenna array that will meet specified performance criteria. Based on structural constraints, an antenna array design system can iterate through possible arrangements of antenna elements and, for each possible arrangement, evaluate whether the arrangement would produce an antenna array that meets specified performance criteria. By performing this iterative process, the antenna array design system can identify a particular arrangement that may best meet the specified performance criteria or at least identify a number of possible arrangements that will meet the specified performance criteria. In this way, an antenna array design suitable for a particular environment/purpose can be quickly and efficiently determined.

Figure 2:
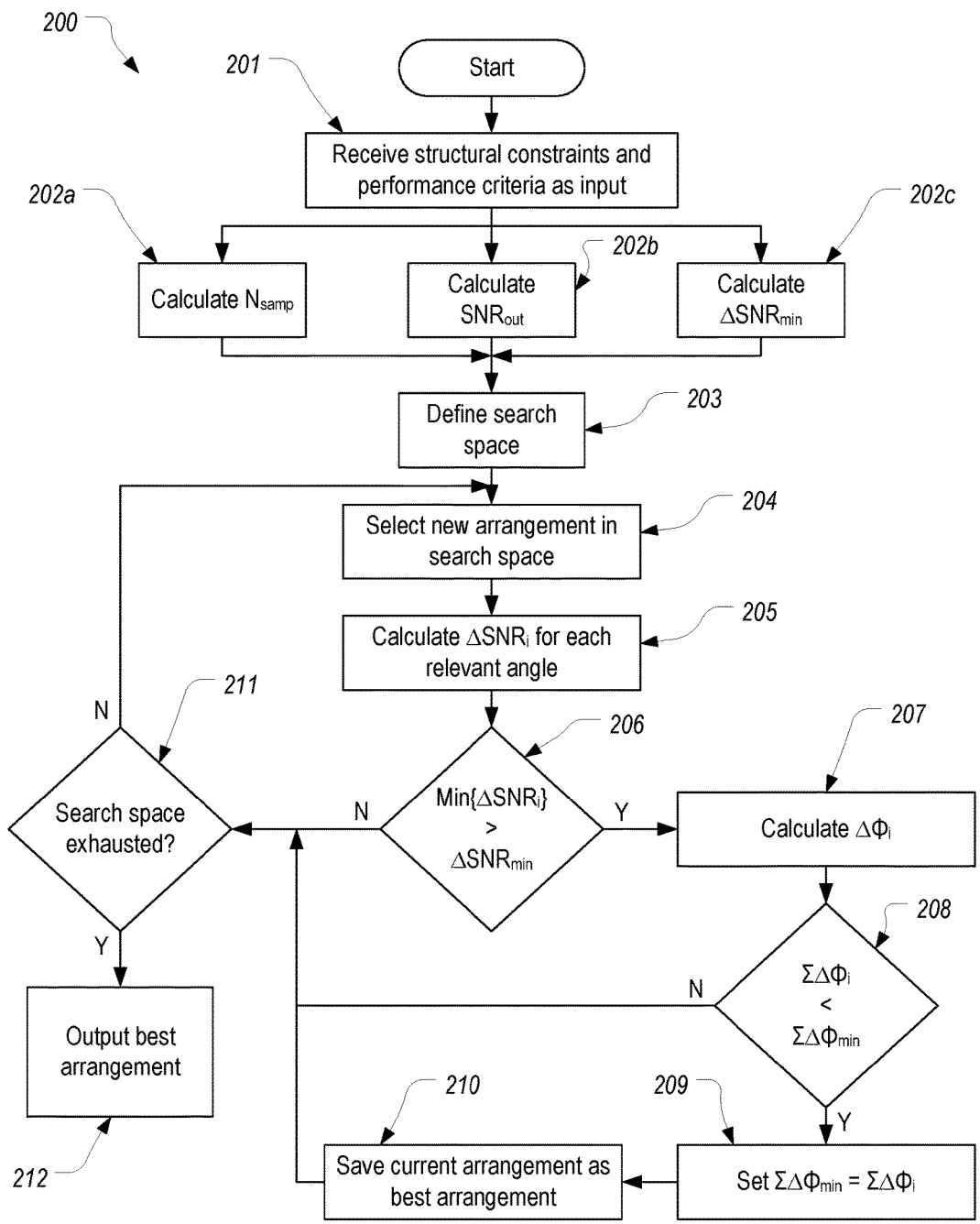
FIG. 2 illustrates a flow diagram of a process for designing an antenna array to meet specified performance criteria.

FIG. 2 provides a flowchart of a process 200 that an antenna array design system can perform to identify an arrangement of antenna elements that meets specified performance criteria and complies with structural constraints. The antenna array design system can be any computing device including a standard computer that executes software that is configured to implement process 200.

Process 200 includes a first step 201 in which the structural constraints and required performance criteria are specified. As an example only, it may be desirable to design an antenna array to be used on an aircraft carrier to geolocate aircraft as they approach for landing. In such a case, the antenna array would need to be highly accurate (e.g., $\sigma_{AoA}=$) 0.01°, have a very low probability of ambiguous arrival ($P_{ambig}=10^{-10}$), and have a high multipath resistance (i.e., low values of $\Delta\phi$ within the field of view). Also, since the aircraft to be geolocated will be relatively close to the antenna array, the SNR of the link may be relatively high (e.g., $SNR_{in}=10$ dB). Further, the field of view for the antenna would need to encompass the area from which the aircraft approach for landing (e.g., $AZ_{min}=-20$, $AZ_{max}=20°$, °, $EL_{min}=-5°$, $EL_{max}=5°$). The number of antenna elements could be specified as 8 (e.g., because the angle of arrival system includes 8 analog/digital converters) and the maximum distance between any two antenna elements could be specified as $48\lambda$ (e.g., to comply with any maximum size limitations on the antenna array). Again, these values will be used for illustrative purposes only and should not be viewed as limiting the invention.

Process 200 includes steps 202a-202c in which a number of initial calculations are performed based on the inputs. In step 202a, the minimum number of samples ($N_{samp}$) that are required to achieve the specified angle of arrival accuracy ($\sigma_{AoA}$) is calculated. A suitable equation for calculating angle of arrival accuracy is as follows:

$$\sigma_{AoA}^2 = \frac{\left| N_{AR} \sum_i \frac{\partial g_i}{\partial Az} + \sum_i \frac{\partial g_i^*}{\partial Az} \sum_i g_i \right|^2}{N_{samp} SNR_{in} \left( \left| \sum_i g_i^* \frac{\partial g_i}{\partial Az} \right|^2 + N_{AR} \mathrm{real}\left[ \sum_i g_i^* \frac{\partial^2 g_i}{\partial Az^2} \right] \right)^2} \quad (3)$$

Equation (3) requires knowledge of the positions of the antenna elements which, for purposes of the present invention, are not known. Therefore, it can be assumed that all antenna elements are arranged on a single axis which allows an upper bound on the angle of arrival accuracy to be defined as:

$$\sigma_{AoA}^2 \leq \frac{2}{N_{samp} SNR_{in}(2\pi d_{max} \cos(\alpha))^2} \quad (4)$$

where $SNR_{in}$, $d_{max}$, and a are all provided as inputs in step 201. The value of a can be set to the maximum angle (e.g., 20° azimuth) off boresight which is where the angle of arrival accuracy will be minimized.

Importantly, equation (4) does not require knowledge of the antenna element arrangement and can therefore be used in process 200 to search for a suitable arrangement of antenna elements. Given the inputs received in step 201, equation (4) can be solved for $N_{samp}$—the only unknown. Solving for $N_{samp}$ yields the number of samples that need to be taken to obtain the required angle of arrival accuracy.

In step 202b, the parameter $SNR_{out}$ can be calculated. $SNR_{out}$ defines the SNR of the link at the worst possible angle and is directly related to the probability of ambiguous arrival. In the present example, this angle would be $\pm 20°$ azimuth. In more detail, an incorrect (or ambiguous) angle of arrival will be detected in cases where the correlation between the received signal and an incorrect steering vector is larger than the correlation between the received signal and the correct steering vector. Such a scenario can be represented as:

$$\sum_k \left| \sum_l x_i g_i^* \right|^2 > \sum_k \left| \sum_l x_i g_{0i}^* \right|^2 \quad (5)$$

where $g_{0i}$ are the elements of the steering vector corresponding to the true angle of arrival and $g_i$ are the elements of the incorrect steering vector. From equation (5), a metric $T(\alpha)$ can be defined as follows:

$$T(\alpha) = \sum_k \left| \sum_l x_i g_i^* \right|^2 - \sum_k \left| \sum_l x_i g_{0i}^* \right|^2 > 0 \quad (6)$$

Due to the central limit theorem, the metric $T(\alpha)$ can be approximated as Gaussian such that the probability of ambiguous arrival ($P_{ambig}$) can be calculated as the probability that $T(\alpha) > 0$ as follows:

$$P_{ambig} = \sum_{m \neq m_0} P(T(\alpha_m) > 0) \quad (7)$$

$$P_{ambig} = \sum_{m \neq m_0} Q\left(\sqrt{SNR_{out}(\alpha_m)}\right) \quad (8)$$

where $SNR_{out}(\alpha_m)$ represents the SNR of $T(\alpha)$ for a signal arriving from the direction $\alpha_i$ based on the assumption that $SNR_{out} > 10$ dB and Q( ) is the Q-function.

Even though $P_{ambig}$ depends on $SNR_{out}$ from all possible angles, it can be approximated by assuming that the worst case angle ($\alpha_{wc}$) will produce a $SNR_{out}$ that is much smaller then at the other angles such that:

$$P_{ambig} = \sum_{m \neq m_0} Q\left(\sqrt{SNR_{out}(\alpha_m)}\right) \approx Q\left(\sqrt{SNR_{out}(\alpha_{wc})}\right) \quad (9)$$

Equation (9) can be evaluated to identify the value of $SNR_{out}$ that will cause $P_{ambig}$ to remain below the specified level even at the worst case angle.

With $SNR_{out}$ determined in step 202b, step 202c can be performed to calculate $\Delta SNR_{min}$ which defines the largest SNR reduction that an antenna element could have at any angle within the defined field of view. A suitable equation for calculating $\Delta SNR_{min}$ is as follows:

$$SNR_{out}(a_i) = \frac{N_{samp} SNR_{in} \left( N_{AR}^2 - \left| \sum_i g_{0i} g_i^* \right|^2 \right)}{4 N_{AR}} \quad (10)$$

$$SNR_{out}(\alpha_m) = N_{samp} SNR_{in} \Delta SNR(\alpha_m) \quad (11)$$

where $N_{AR}$ represents the number of antenna elements, $N_{samp}$ is the result of step 201 described above, $SNR_{in}$ is an input (or assumed) and $\Delta SNR(\alpha_m)$ represents the SNR reduction. In other words, the smaller the value of $\Delta SNR$, the smaller the value of $SNR_{out}$ will be.

Equation (11) can be evaluated for all angles of interest (e.g., from $-20°$ to) $20°$ to identify the minimum for $\Delta SNR(\alpha_m)$. $\Delta SNR_{min}$ can be set to this identified minimum in step 202c. $\Delta SNR_{min}$ therefore defines the smallest value of $\Delta SNR(\alpha_m)$ that will still yield an acceptable probability of ambiguous arrival.

With $N_{samp}$, $SNR_{out}$, and $\Delta SNR_{min}$ calculated, process 200 can proceed to step 203 in which the search space is defined. The search space can be any volume within a three dimensional space that will cause the antenna array to comply with the structural constraints. For example, the search space may be selected to provide the specified field of view and to comply with the maximum distance parameter $d_{max}$. In many cases, the antenna array may only need to provide a narrow field of view such that a two dimensional arrangement of antenna elements would be sufficient. In such cases, the search space can be defined as a two dimensional area (i.e., a plane) to minimize the processing required. Although the antenna elements could be placed anywhere in the search space, further constraints on the search space may be defined to allow an exhaustive search to be performed in a reasonable amount of time. For example, the search space could be limited to positions on the y and z axes. As part of defining the search space, the antenna array design system may also identify each possible antenna element position within the search space. These possible positions can be constrained by spacing requirements (e.g., a half wavelength ($\lambda/2$) between each possible position) such that the search space is divided into a grid of possible positions. In short, the result of step 203 is a search space comprised of a number of possible positions for antenna elements.

In step 204, the iterative portion of process 200 is commenced. In particular, step 204 entails the selection of a new arrangement of antenna elements within the search space. In this context, "new" refers to an arrangement that has yet to be evaluated. Each arrangement can include the number of antenna elements, $N_{AR}$, which was specified in step 201, and each of the antenna elements can be positioned in one of the possible positions in the search space. In some embodiments, additional spacing constraints may be applied to ensure that two antenna elements are not positioned too closely together. For example, a minimum spacing of 4 wavelengths between adjacent antenna elements could be defined.

With a new arrangement selected and in step 205, the antenna array design system can calculate $\Delta SNR_i$ for every possible angle within the field of view. This can be accomplished using equation (11) as defined above. Accordingly, the result of step 205 is a listing of the SNR reductions at every possible angle that will exist with the selected arrangement.

In step 206, the minimum value of $\Delta SNR_i$ that was calculated in step 205 can be determined and compared with the value of $\Delta SNR_{min}$ which was calculated in step 202c. Since $\Delta SNR_{min}$ represents the minimum value that will still provide the required probability of ambiguous arrival $P_{ambig}$, as long as the minimum value of $\Delta SNR_i$ is greater than $\Delta SNR_{min}$, the probability of ambiguous arrival of the selected arrangement will be lower than the required probability $P_{ambig}$. In other words, step 206 tests whether the selected arrangement of antenna elements will provide a probability of ambiguous arrival that is below (i.e., better than) the specified threshold $P_{ambig}$.

If the minimum value of $\Delta SNR_i$ is less than $\Delta SNR_{min}$, it will be known that the selected arrangement is not a suitable arrangement (because the probability of ambiguous arrival would be too high) and process 200 can transition to step 211. In step 211, it will be determined whether there are additional arrangements within the search space that have not been evaluated, and if so, process 200 will transition back to step 204 for the next iteration. In contrast, if the minimum value of $\Delta SNR_i$ is greater than $\Delta SNR_{min}$ (i.e., the SNR reduction of the selected arrangement is not as bad as the worst case scenario that will still meet the required $P_{ambig}$), process 200 can transition to step 207 to allow the selected arrangement to be further evaluated.

In step 207, the effects of coherent multipath on the selected arrangement in various directions are estimated. For simplicity, the effects of multipath on the azimuth angle will be described. It is noted, however, that a similar analysis can be performed with respect to the elevation angle. This multipath analysis employs the first and second derivatives of $g_i$ (equation (1)) with respect to the azimuth angle which can be defined as follows:

$$\frac{\partial g_i}{\partial Az} = -j2\pi(-u_y, u_x, 0) \cdot P_i g_i \quad (12)$$

$$\frac{\partial^2 g_i}{\partial Az^2} = (j2\pi U \cdot P_i - (2\pi(-u_y, u_x, 0) \cdot P_i)^2) g_i \quad (13)$$

As mentioned above, an angle of arrival system determines the angle of arrival by correlating the received signal $x_i$ at each antenna element with conjugated elements of the steering vector $g_i$ for a particular angle of arrival, takes the magnitude squared of the result, and compares the results for every angle of interest. The angle that produces the largest correlation C is selected as the angle of arrival. This correlation can be represented as:

$$C = \sum_k \left| \sum_i x_i g_i^* \right|^2 \quad (14)$$

where the summation on k represents averaging over multiple samples. However, because the multipath effects are not affected by averaging over multiple samples, it can be assumed that k=1 yielding:

$$C = \left( \sum_i x_i g_i^* \right)\left( \sum_i g_i x_i^* \right) \quad (15)$$

which can be expressed in matrix format as:

$$C = GX^H XG^H \quad (16)$$

where X and G are the vectors:

$$X=(x_1,x_2,\ldots x_N) \; G=(g_1,g_2,\ldots g_N)$$

and where $(\bullet)^H$ represents the conjugate transpose of a matrix and N represents the number of antenna element ($N_{AR}$).

With C calculated for each relevant angle, the angle corresponding to the largest value of C is selected as the estimated angle of arrival. This can be represented mathematically as:

$$\frac{\partial C(Az)}{\partial Az} = 0 \quad (17)$$

Based on the assumption that the error caused by coherent multipath is very small, equation (17) can be approximated as:

$$\frac{\partial C(Az)}{\partial Az} \cong \frac{\partial C(Az = Az_0)}{\partial Az} + \frac{\partial^2 C(Az = Az_0)}{\partial Az^2}\Delta\phi = 0 \quad (18)$$

where $Az_0$ represents the true angle of arrival and $\Delta\phi$ represents the angle of arrival error caused by coherent multipath. Solving equation (18) for $\Delta\phi$ yields:

$$\Delta\phi = -\frac{\frac{\partial C(Az = Az_0)}{\partial Az}}{\frac{\partial^2 C(Az = Az_0)}{\partial Az^2}} \quad (19)$$

The first derivative of C can be calculated from equation (16) as:

$$\frac{\partial C}{\partial Az} = \frac{\partial (GX^H XG^H)}{\partial Az} = \frac{\partial G}{\partial Az}X^H XG^H + GX^H X\frac{\partial G^H}{\partial Az} \quad (20)$$

If the matrix multiplications in equation (20) are reordered and the entire second term is conjugated, it yields:

$$\frac{\partial C}{\partial Az} = 2\text{real}\left(\frac{\partial G}{\partial Az}X^H XG^H\right) \quad (21)$$

The second derivative of C can be calculated in a similar manner to yield:

$$\frac{\partial^2 C}{\partial Az^2} = 2\text{real}\left(\frac{\partial^2 G}{\partial AZ^2}X^H XG^H\right) + 2\text{abs}\left(\frac{\partial G}{\partial Az}X^H\right)^2 \quad (22)$$

Therefore, to calculate the angle of arrival error resulting from coherent multipath ($\Delta\phi$) in step 207, equations (21) and (22) can be substituted into equation (19). Also, to calculate the first and second derivatives defined in equations (21) and (22), equations (1), (12) and (13), which define the elements of G, $\partial G/\partial Az$ and $\partial^2 G/\partial Az^2$ respectively, can be employed.

For reasons that are beyond the scope of this disclosure, the worst multipath error results when the relative phase between the direct path and the multipath is 90°. Therefore, in step 207, the multipath effects need only be evaluated for 90° relative phase. In this way, the amount of processing required in step 207 can be minimized. The results of step 207 will therefore be an angle of arrival error ($\Delta\phi_i$) for every angle of interest in the field of view.

In step 208, the angle of arrival error ($\Delta\phi_i$) due to multipath for all of the angles of interest can be summed to produce $\Sigma\Delta\phi_i$ pertaining to the currently selected arrangement of antenna elements. This sum, $\Sigma\Delta\phi_i$, can then be compared to the lowest identified sum, $\Sigma\Delta\phi_{min}$, from previous iterations. In other words, the antenna array design system can identify whether the selected arrangement of antenna elements exhibits better multipath resistance than all previously evaluated arrangements (or, more appropriately, better than all previously evaluated arrangements that were determined to meet the required $P_{ambig}$).

If the selected arrangement does not exhibit better multipath resistance (i.e., if $\Sigma\Delta\phi_i$ exceeds $\Sigma\Delta\phi_{min}$), process 200 can transition to step 211 to perform the next iteration. In contrast, if the selected arrangement exhibits better multipath resistance (i.e., if $\Sigma\Delta\phi_i$ is less than $\Sigma\Delta\phi_{min}$, the value of $\Sigma\Delta_{min}$ can be set to the value of $\Sigma\Delta\phi_i$ in step 209 (to thereby preserve the new best value for subsequent iterations) and the selected arrangement of antenna elements (i.e., the positions of each antenna element) can be saved as the best arrangement in step 210. Process 200 can then transition to step 211.

Finally, after each possible arrangement of antenna elements has been evaluated, the determination in step 211 will be positive causing process 200 to transition to step 212 where the best arrangement identified during the iterative process is output. This best arrangement will be the arrangement that provides a probability of ambiguous arrival below the specified level and that exhibits the lowest sum of multipath errors across the angles of interest.

Although process 200 is described as outputting a single best arrangement, in some embodiments, more than one best arrangement could be identified. For example, in step 209 and 210, the antenna array design system could identify and save the five arrangements that exhibit the lowest values for $\Sigma\Delta\phi_i$. In this way, the antenna array design system could identify a number of possible arrangements that would meet the specified performance criteria.

In summary, the present invention provides a process by which an antenna array design system can identify at least one arrangement of antenna elements from among many possible arrangements that will best meet specified performance criteria based on specified structural constraints. The present invention therefore allows an antenna array to be more quickly and efficiently designed for a particular application.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by an antenna array design system, for identifying an arrangement of antenna elements that will meet required performance criteria based on structural constraints, the method comprising:

receiving input that defines required performance criteria for an antenna array, the required performance criteria including an angle of arrival accuracy and a probability of ambiguous arrival;

receiving input that defines structural constraints for the antenna array, the structural constraints including a number of antenna elements, a field of view, and a maximum distance between any two antenna elements in one dimension;

calculating, based on the structural constraints, a number of samples that are required to achieve the angle of arrival accuracy;

calculating, based on the structural constraints and the number of samples, a minimum signal to noise ratio reduction parameter;

identifying, based on the structural constraints, a search space within which antenna elements of the antenna array will be positioned;

selecting a first arrangement of the number of antenna elements within the search space;

calculating, for each of a number of angles within the field of view, a signal to noise ratio reduction parameter for the first arrangement;

determining that a minimum of the noise ratio reduction parameters calculated for the first arrangement exceeds the minimum signal to noise ratio reduction parameter;

calculating, for each of a number of angles within the field of view, an angle of arrival error resulting from coherent multipath for the first arrangement and generating a sum of the angle of arrival errors for the first arrangement;

determining that the sum of the angle of arrival errors for the first arrangement is less than a corresponding sum of angle of arrival errors for one or more other arrangements of antenna elements; and generating output that identifies that the first arrangement meets the required performance criteria and provides better multipath resistance than the one or more other arrangements.

2. The method of claim 1, wherein the number of samples is calculated based on an angle within the field of view, the maximum distance, the angle of arrival accuracy, and a signal to noise ratio.

3. The method of claim 2, wherein the signal to noise ratio is included in the input that defines the required performance criteria.

4. The method of claim 1, wherein the minimum signal to noise ratio reduction parameter is calculated based on the number of antenna elements, the number of samples, a signal to noise ratio of a signal received at the antenna elements, and a signal to noise ratio at an output of an angle of arrival estimator.

5. The method of claim 1, wherein identifying a search space comprises defining a volume or an area that complies with the maximum distance.

6. The method of claim 5, wherein identifying a search space further comprises defining a volume or an area that will provide the field of view.

7. The method of claim 5, wherein identifying a search space further comprises identifying a number of possible positions with the defined volume or area where an antenna element may be placed, each position being spaced by a defined minimum distance.

8. The method of claim 1, further comprising:
selecting a second arrangement of the number of antenna elements within the search space, the second arrangement being different from the first arrangement;
calculating, for each of the number of angles within the field of view, a signal to noise ratio reduction parameter for the second arrangement;
determining that a minimum of the noise ratio reduction parameters calculated for the second arrangement does not exceed the minimum signal to noise ratio reduction parameter; and
ceasing evaluation of the second arrangement.

9. The method of claim 1, further comprising:
selecting a second arrangement of the number of antenna elements within the search space, the second arrangement being different from the first arrangement;
calculating, for each of the number of angles within the field of view, a signal to noise ratio reduction parameter for the second arrangement;
determining that a minimum of the noise ratio reduction parameters calculated for the second arrangement exceeds the minimum signal to noise ratio reduction parameter;
calculating, for each of a number of angles within the field of view, an angle of arrival error resulting from coherent multipath for the second arrangement and generating a sum of the angle of arrival errors for the second arrangement; and
determining that the sum of the angle of arrival errors for the second arrangement is greater than the sum of the angle of arrival errors for the first arrangement.

10. The method of claim 1, wherein determining that the sum of the angle of arrival errors for the first arrangement is less than a corresponding sum of angle of arrival errors for one or more other arrangements of antenna elements comprises determining that the sum of the angle of arrival errors for the first arrangement is less than a corresponding sum of angle of arrival errors for all other arrangements of antenna elements within the search space.

11. The method of claim 10, wherein the output identifies that the first arrangement provides better multipath resistance than all other arrangements of antenna elements within the search space.

12. The method of claim 1, wherein the search space is an area that aligns with two axes.

13. The method of claim 12, wherein the area only includes positions that lie on one or both of the two axes.

14. An antenna array design system comprising one or more non-transitory computer readable media storing computer-executable instructions which when executed implement a method for identifying an arrangement of antenna elements that will meet required performance criteria based on structural constraints, the method comprising:
receiving input that defines required performance criteria for an antenna array, the required performance criteria including an angle of arrival accuracy and a probability of ambiguous arrival;
receiving input that defines structural constraints for the antenna array, the structural constraints including a number of antenna elements, a field of view, and a maximum distance between any two antenna elements in one dimension;
calculating, based on the structural constraints, a number of samples that are required to achieve the angle of arrival accuracy;
calculating, based on the structural constraints and the number of samples, a minimum signal to noise ratio reduction parameter;
identifying, based on the structural constraints, a search space within which antenna elements of the antenna array will be positioned; and
iteratively evaluating a plurality of possible arrangements of the antenna elements within the search space including, for each possible arrangement:
calculating, for each of a number of angles within the field of view, a signal to noise ratio reduction parameter for the arrangement;
determining whether a minimum of the noise ratio reduction parameters calculated for the arrangement exceeds the minimum signal to noise ratio reduction parameter;
when the minimum of the noise ratio reduction parameters calculated for the arrangement exceeds the minimum signal to noise ratio reduction parameter, calculating, for each of a number of angles within the field of view, an angle of arrival error resulting from coherent multipath for the arrangement and generating a sum of the angle of arrival errors for the arrangement; and
determining whether the sum of the angle of arrival errors for the arrangement is less than a corresponding sum of angle of arrival errors for previously evaluated arrangements, and if so, saving the arrangement as a best arrangement.

15. The antenna array design system of claim 14, wherein the method further comprises:
after iteratively evaluating the plurality of possible arrangements, outputting the best arrangement.

16. The antenna array design system of claim 14, wherein when the minimum of the noise ratio reduction parameters calculated for the arrangement does not exceed the minimum signal to noise ratio reduction parameter, evaluation of the arrangement is terminated.

17. The antenna array design system of claim 14, wherein the arrangement is saved as the best arrangement when the sum of the angle of arrival errors for the arrangement is less than a corresponding sum of angle of arrival errors for all previously evaluated arrangements.

18. The antenna array design system of claim 14, wherein the number of samples is calculated based on an angle within the field of view, the maximum distance, the angle of arrival accuracy, and a signal to noise ratio.

19. A method, performed by an antenna array design system, for identifying an arrangement of antenna elements that will meet required performance criteria based on structural constraints, the method comprising:
  receiving input that defines required performance criteria for an antenna array, the required performance criteria including an angle of arrival accuracy and a probability of ambiguous arrival;
  receiving input that defines structural constraints for the antenna array;
  calculating, based on the structural constraints, a number of samples that are required to achieve the angle of arrival accuracy;
  calculating, based on the structural constraints and the number of samples, a minimum signal to noise ratio reduction parameter;
  identifying, based on the structural constraints, a search space within which antenna elements of the antenna array will be positioned;
  iteratively evaluating a plurality of possible arrangements of a number of antenna elements within the search space including, for each possible arrangement:
    calculating, for each of a number of angles, a signal to noise ratio reduction parameter for the arrangement;
    determining whether a minimum of the noise ratio reduction parameters calculated for the arrangement exceeds the minimum signal to noise ratio reduction parameter;
    when the minimum of the noise ratio reduction parameters calculated for the arrangement exceeds the minimum signal to noise ratio reduction parameter, calculating, for each of a number of angles, an angle of arrival error resulting from coherent multipath for the arrangement and generating a sum of the angle of arrival errors for the arrangement; and
    determining whether the sum of the angle of arrival errors for the arrangement is less than a corresponding sum of angle of arrival errors for previously evaluated arrangements, and if so, saving the arrangement as a best arrangement.

20. The method of claim 19, wherein the structural constraints include one or more of:
  a number of antenna elements;
  a field of view; or
  a maximum distance between any two antenna elements in one dimension.

* * * * *